FIG_8

Nov. 1, 1955   E. A. DAVIS   2,722,377
DIVIDEND-DIVISOR ALIGNING MECHANISM
Filed Jan. 23, 1953   10 Sheets-Sheet 9

FIG_11

United States Patent Office 2,722,377
Patented Nov. 1, 1955

2,722,377

DIVIDEND-DIVISOR ALIGNING MECHANISM

Elwood A. Davis, Hayward, Calif., assignor to Friden Calculating Machine Co., Inc., a corporation of California Application January 23, 1953, Serial No. 332,790

9 Claims. (Cl. 235—63)

This invention relates to a division mechanism for calculating machines, and more particularly to an improved mechanism of the general type disclosed in the copending applications of Hopkins et al., S. N. 200,656 and S. N. 207,958, filed December 13, 1950, and January 26, 1951, respectively, the latter of which has issued as Patent No. 2,666,580, on January 19, 1954, for automatically aligning the dividend and divisor in such a machine as part of an automatic division operation.

In performing division operations on calculating machines of the type having relatively shiftable dividend and divisor receiving devices, it has been necessary in the past for the operator of the machine to enter the dividend and divisor factors into the machine and then to manually control the shift of the factor receiving devices relative to one another until the factors are brought into proper alignment before beginning an automatic division operation. The division mechanism is then set into operation by manipulation of a suitable control key, or lever, and the machine proceeds to divide the dividend by the divisor in a fully automatic manner without requiring any further attention on the part of the operator. The instant invention deals with an improved mechanism for rendering the operation of such a calculating machine more completely automatic by causing the dividend and divisor to be properly aligned prior to the outset of the division operation proper.

It is an important object of the present invention to provide an improved mechanism for automatically aligning the dividend and divisor factors in a calculating machine by causing the register carriage thereof to be shifted towards the right end position before automatically initiating operation of the automatic division mechanism of the machine, which right shift is terminated as soon as the factors are aligned instead of at the rightmost position as disclosed in the applications above-mentioned.

It is another object of the invention to provide an improved mechanism for automatically aligning the dividend and divisor factors in a calculating machine and then dividing the former by the latter in an uninterrupted series of sequential operations by causing the machine to automatically shift the register carriage to the right until the factors are properly aligned, delaying operation of the automatic division mechanism until after the right shift operation has been terminated.

It is a further object of the invention to provide an improved method and means of aligning preselected dividend and divisor factors in a calculating machine and then dividing the former by the latter as part of a single continuous operation by automatically engaging and locking the carriage shift mechanism of the machine in its right shift position without initial operation of the automatic division mechanism, and then automatically terminating the right shift operation and concurrently initiating operation of the automatic division mechanism after the shiftable carriage has properly aligned the two factors (actually terminating the shift when the highest digit of the dividend is one order below the highest digit of the divisor—which is an overshift of one order that has no effect on the accuracy of the quotient).

It is also an object of the instant invention to provide improved mechanism for automatically carrying out a division operation by first causing the carriage of a calculating machine to be shifted continuously toward the right, terminating the right carriage shift operation automatically as soon as the highest order of the dividend is aligned with the highest order of the divisor, and then automatically initiating operation of the division mechanism of the machine (which includes the conventional shift of the carriage progressively toward the left as required by the division operation).

These, and other, objects of the invention will become apparent from a consideration of the specification which follows. The specification will be more readily understood by a reference to the drawings, which include.

GENERAL MECHANISM

The machine to be hereinafter shown and described is basically the same as the calculating machine shown in U. S. Patent No. 2,229,889 issued to Carl M. F. Friden on January 28, 1941, as modified by the applications above-mentioned, and especially S. N. 207,958, filed January 26, 1951, of this applicant and others. Mechanism which is conventional in the machine of the aforesaid patent will not be described herein unless necessary to provide a complete understanding of the mechanism of the present invention. However, mechanism which was new in the application just mentioned will be more fully explained as, in one sense, this invention is an improvement thereon, using all of the mechanisms there shown and, in addition, certain new mechanisms to be described.

Selecting and actuating mechanisms

Figure 1:
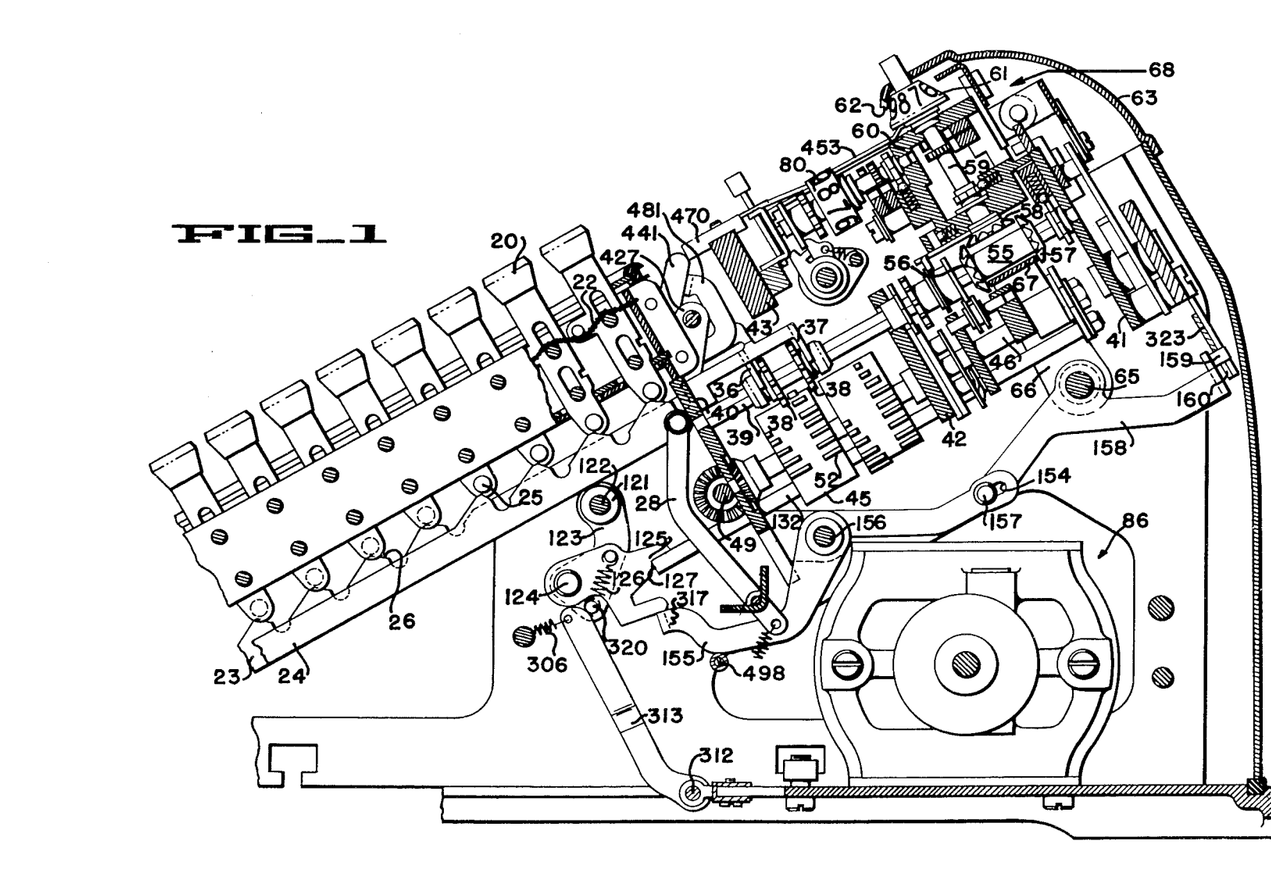
Fig. 1 is a longitudinal sectional elevation showing the right shift control mechanism and basic selecting and actuating mechanisms of the machine.

The conventional machine of the aforesaid patent includes a selection mechanism including (as shown in Fig. 1) a plurality of ordinally arranged rows, or orders, of value keys 20, each of which is supported for vertical movement in the keyboard frame. The value keys 20 in each order are resiliently urged into their raised positions by means of a longitudinally extending coil spring 22, as shown. The lower ends of the key stems carry studs 25 which are adapted to cooperate with differentially inclined cam faces 26 provided on the longitudinally disposed selection slides 23 and 24. There are two such slides associated with each order of keys in the keyboard, slide 23 serving the "1" to "5" keys 20 and slide 24 serving the "6" to "9" keys, as is conventional of the machine of said patent. Each slide is supported for endwise reciprocating movement below the keyboard by means of a pair of parallel arms 28, only one of which is shown in Fig. 1. At their rearward ends, the selection slides 23, 24 are provided with yokes 36 and 37, respectively, which engage coacting grooves provided in the hubs of a pair of selection gears 38. These selection gears are slidably mounted on a square shaft 39, which is suitably journalled in the crossframe members 40, 41, and 42, extending transversely across the machine.

The selector gears 38 are arranged to cooperate with a drum-type actuator 45 secured to an actuator shaft 46 which is journalled between the crossframe members 40 and 42. The shaft is driven by means of suitable bevel gears from a unidirectional main drive shaft 49. It is conventional, in the machine of the above-mentioned patent, to mount two actuator drums on each shaft 46, whereby one such shaft can serve two orders of the selection mechanism and register. The actuator drums 45 are provided with a series of mutilated actuator teeth 52 which serve to rotate the selector gears 38 by differential amounts whenever the latter are moved differentially along the square shaft 39 by translation of the selection slides 23 or 24.

A plus-minus, or digitation, sleeve 55 is slidably mounted on the rear end of each square shaft 39, and is provided with an add gear 56 and an oppositely disposed subtract gear 57. These gears are arranged to cooperate selectively with accumulator gears 58 secured to the lower end of accumulator dial shafts 59, the latter being suitably journalled in the frame 60 of the shiftable numeral wheel carriage 68. Secured to the upper end of each shaft 59 is a numeral wheel 61 bearing the numerals from "0" to "9," which may be viewed through a suitable aperture or window 62 provided in the shiftable carriage housing 63. The add and subtract gears 56 and 57 are normally maintained in the disengaged, or neutral, position shown, and are positioned by a conventional gate 67 mounted on a pair of arms 66 affixed to a digitation control shaft 65. Whenever gears 56 and 57 are maintained in their neutral position by the action of a centralizer, not shown, the numeral wheel carriage 68 may be shifted laterally across the machine without interference from either gear. In digitation, however, the shaft 65 and gate 67 are rocked one way or the other, to shift spool 55 along its square shaft 39 so that one of the gears 56 or 57 mesh with gear 58.

Digitation control

A plus key 90 and a minus key 91 (Fig. 2), slidably mounted on a control plate 32, selectively determine positive or negative registration on the carriage numeral wheels 61. Depression of either of the keys 90, 91 also serves to engage the clutch and close the motor circuit to operate the machine. The plus and minus keys 90, 91 are provided with the respective roller studs 93 and 94 (Fig. 2) which, upon depression of the key, engage one of the opposed cam faces 95 and 96, respectively, formed on a gate setting slide 97. Slide 97 is pivotally connected to the upper ends of arms 98 and 101, the arm 98 being pivoted on the control plate 32, while the arm 101 is secured to, and rocks, the gate shaft 65. Thus, depression of plus key 90 moves the gate setting slide 97 rearwardly to rotate shaft 65 (clockwise in Fig. 1), and move the gate 67 toward the rear of the machine, thus causing the add gears 56 to engage the dial shaft gears 58. Similarly, depression of the minus key 91 brings stud 94 into engagement with the inclined surface 96, thereby causing slide 97 to move forwardly to rotate gate shaft 65 in the opposite direction (counter-clockwise in Fig. 1), so as to bring the subtract gears 57 into engagement with the dial shaft gears 58.

Figure 2:
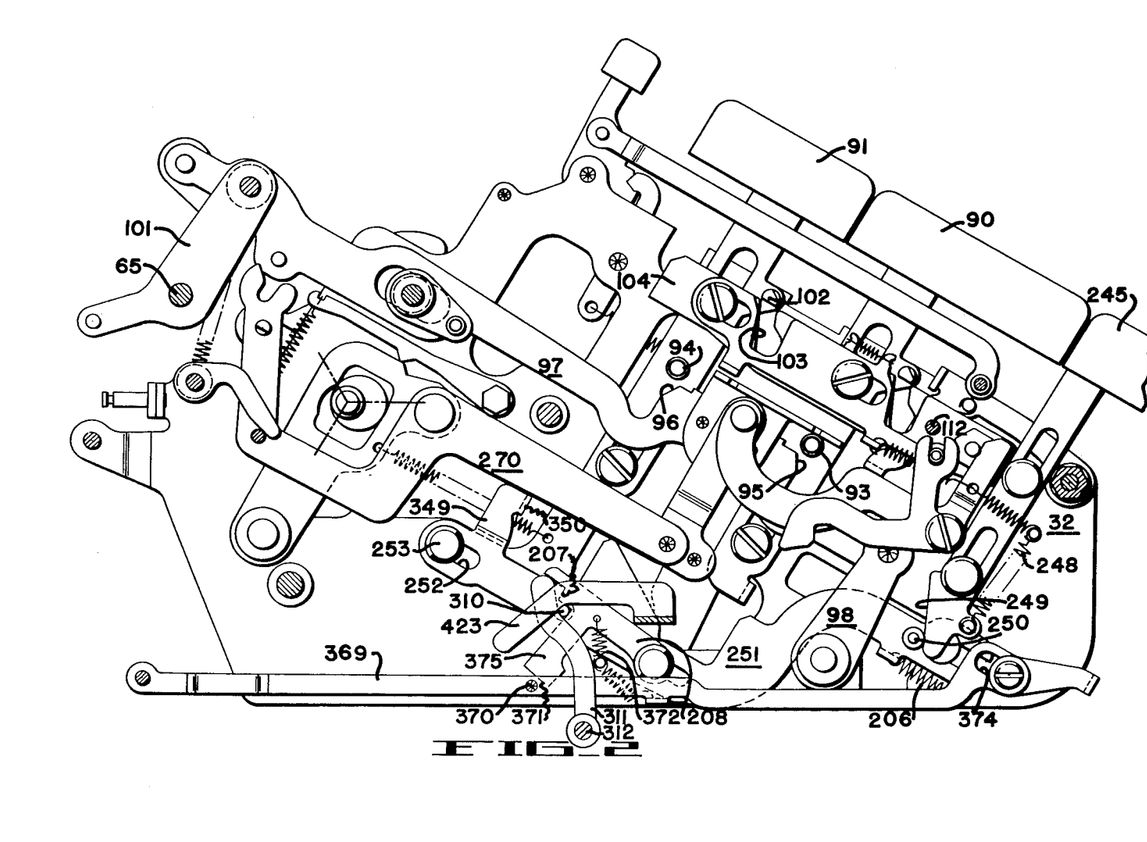
Fig. 2 is a left side elevation of the right-hand control plate, showing those parts of the division control mechanism which are mounted thereon, and particularly the mechanism for first aligning the dividend with the divisor.
Figures 3, 4:
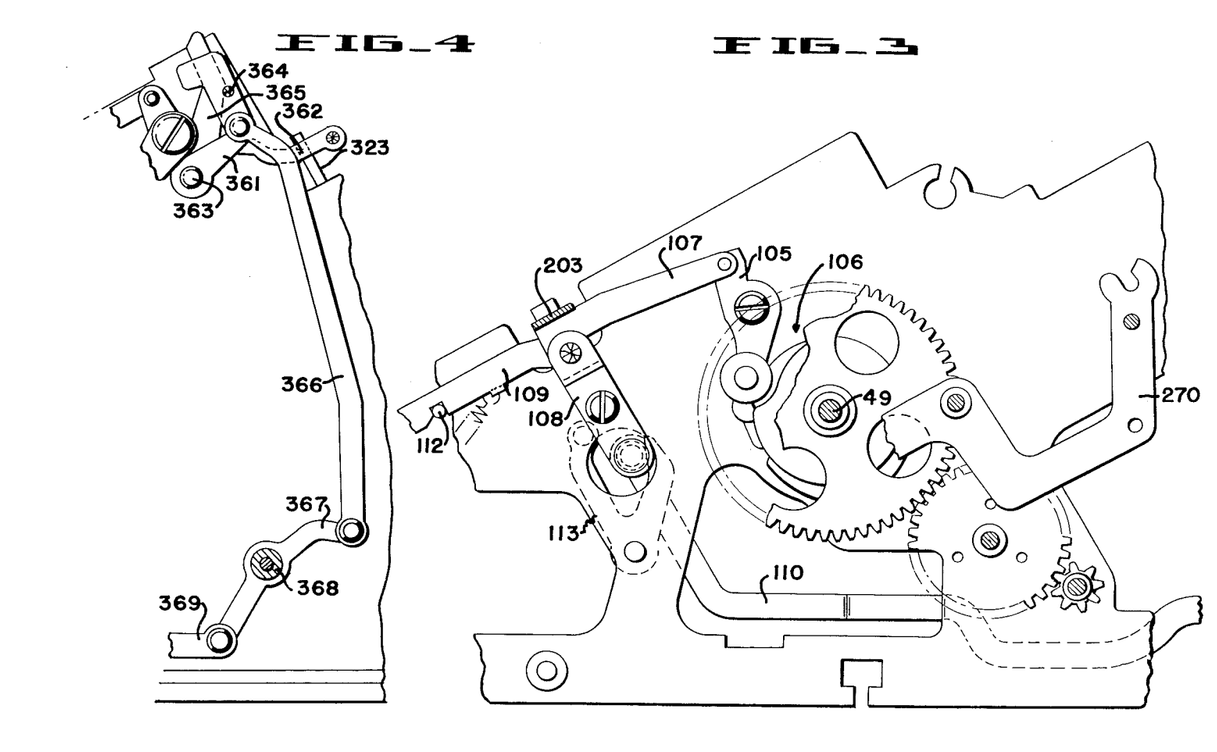
Fig. 3 is a right side elevation of the right side frame plate, showing the mechanism for operating the main cyclic clutch and the motor control switch.
Fig. 4 is a view similar to Fig. 3 showing a portion of the control means for releasing the automatic aligning mechanism when the carriage is in its rightmost end position.

In order to initiate operation of the drive mechanism of the machine when either of the control keys 90 or 91 is depressed, each of these keys is provided with a half-round stud 102 which is adapted to cooperate with a cam face 103 provided on the cycle initiating slide 104 (Fig. 2). This slide 104 carries a pin 112 which is embraced in a slot in a clutch control link 109 (see Fig. 3). The link is pivotally connected to a lever 108 and a link 107, as shown. The link 107 is connected to a clutch control lever 105, whereby operation of either of the control keys 90 or 91 causes the slide 104 and links 109 and 107 to be moved rearwardly, thereby rocking the clutch control lever 105 (clockwise in Fig. 3) to cause engagement of the main cyclic clutch 106. The lever 108 is pivotally connected to a long switch closing link 110 adapted to close the normally open contacts of a micro-switch, not shown, thereby closing the circuit to the electric motor 86 (Fig. 1) that drives the machine.

Carriage shift mechanism

Figures 5, 6:
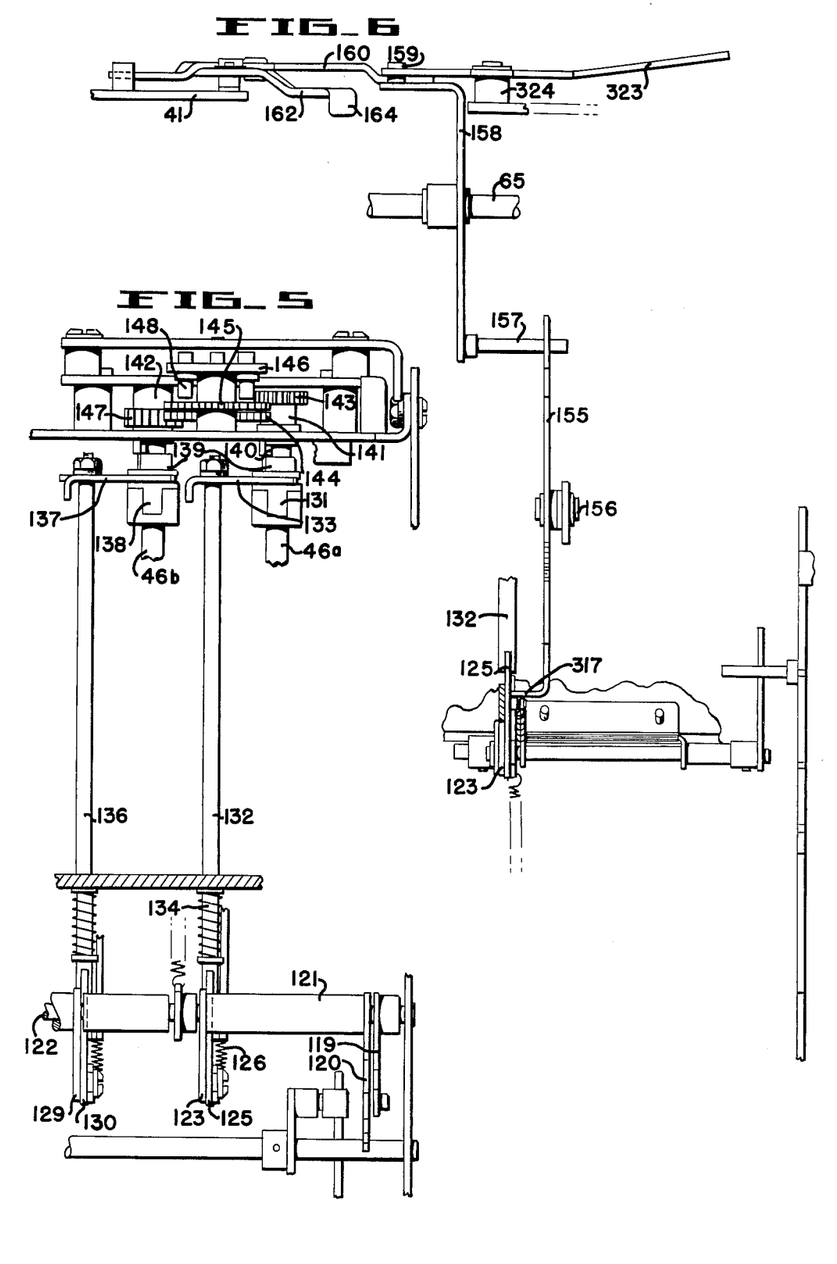
Fig. 5 is a plan view showing the carriage shift control mechanism of the machine.
Fig. 6 is a plan view of the mechanism for releasing the right shift clutch and concurrently initiating operation of the automatic division mechanism after the carriage has reached its rightmost end position.

A conventional mechanism is provided for shifting the carriage 68 selectively in either direction for one or more ordinal steps of movement. The shifting means is preferably operated from the extended actuating shafts 46a and 46b (Fig. 5). The shift mechanism is operated by a pair of manually depressible shift keys, not shown, and certain automatic mechanisms, one of which will be described hereinafter.

Depression of the left shift key, not shown, rocks an arm 119 downwardly (counter-clockwise when viewed from the right). The arm 119 is rigidly secured to shaft 122, which carries an arm 129. This arm, in turn, carries a pivotally mounted pusher arm 130, which normally engages the forward end of a left shift clutch control rod 136. Similarly, depression of the right shift key, not shown, rocks an arm 120 downwardly. This arm is rigidly secured to a sleeve 121, rotatably mounted on shaft 122. The sleeve 121, also shown in Fig. 1, carries an integral arm 123 which pivotally supports a pusher arm 125. A shoulder 127 on this pusher arm 125 normally engages a right shift clutch control rod 132. Both pusher arms 130 and 125, are biased into engagement with their respective clutch control arms 136 and 132 by suitable springs 126. Thus, depression of either shift key is operative to translate the proper clutch control rod rearwardly to cause operation of the shift mechanism. Subsequent to the translation of the clutch control rods, depression of the shift keys is also operative to cause closing of the motor switch and engagement of the clutch by rocking bellcrank 113 (shown in Fig. 3) by means not here shown.

The translation of the respective push rods 132 and 136 controls operation of the respective drive connections from one of the extended actuating shafts 46a and 46b, respectively, to a shift drive plate 146 in a manner now to be described. As seen in Fig. 5, each of the push rods 132 and 136 has secured to the rear end thereof, a forked arm, or clutch yoke, 133 and 137 respectively. Forked arms 133 and 137 engage respective annular grooves in shiftable clutch members 131 and 138, which are slidably but nonrotatably mounted on the rearward ends of the adjacent extended actuating shafts 46a and 46b, respectively. The shiftable collars 131 and 138 are provided with suitable driving teeth 139 adapted for clutching engagement with the opposed teeth 140 on the respective gear sleeves 141 and 142.

Figure 7:
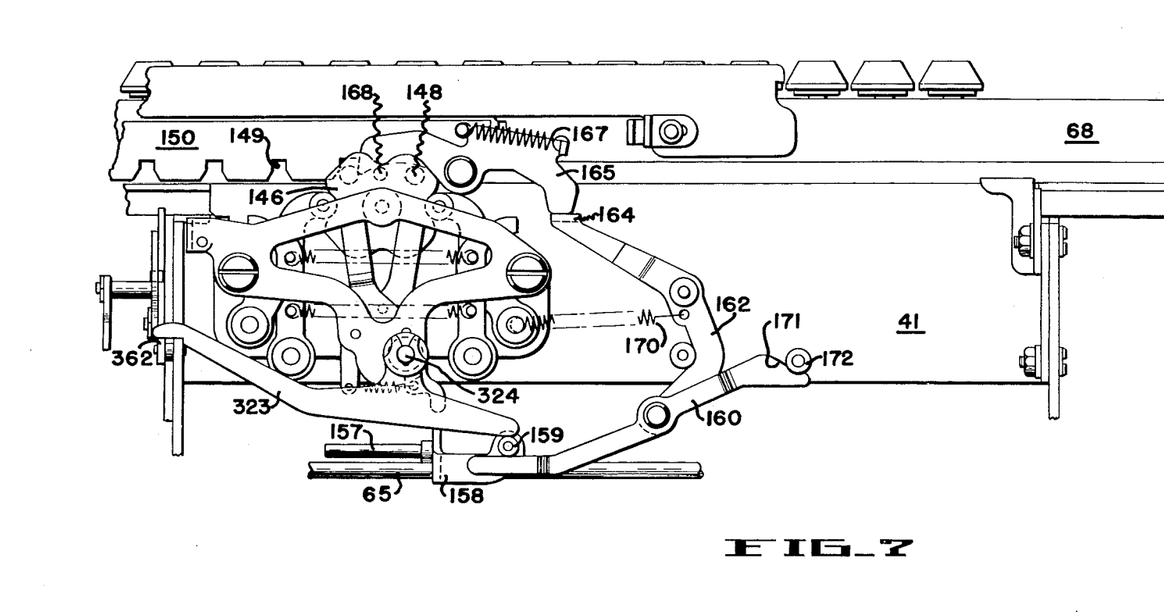
Fig. 7 is a fragmentary rear view of the machine showing a portion of the control mechanism illustrated in Fig. 6.

As shown in Fig. 5, gear sleeve 141 carries a gear 143 which meshes with a wide idler gear, not shown, which drives a large gear 144. The large gear 144 is part of a compound gear assembly including a smaller gear (not shown) meshing with a gear 145 on a shift drive assembly which includes the shift drive plate 146. Gear sleeve 142 carries a gear 147 which meshes directly with gear 144 of the drive gear assembly. Hence, when either the gear sleeves 141 and 142 are clutched to their respective drive shafts 46a and 46b, they serve to drive the gear train which includes the large gear 144 and shift drive plate 146 in the selected direction. Preferably this gearing provides a drive ratio of 4 to 1, so that each rotation of the gear sleeves 141 or 142 will provide a one-quarter rotation of shift drive plate 146. As is best shown in Fig. 7, plate 146 carries four equidistantly spaced shift drive pins 148 adapted for engagement with coating notches 149 provided in a shift rack 150 secured to the back of the shiftable carriage 68. Hence, for each ninety degrees of rotation of shift drive plate 146 the carriage 68 will be shifted through a distance equal to the spacing between the notches 149, which is equal to the ordinal distance between the accumulator dial shafts 59 of the machine. In other words, the carriage will be shifted one ordinal space for each cycle of operation of the machine.

Means is provided for automatically disabling the right carriage shift operation whenever the shiftable carriage 68 reaches its extreme right end position (shown in Fig. 7). For this purpose mechanism is provided for automatically lifting the pusher link 125 out of engagement with push rod 132 (Fig. 1) whenever the carriage reaches its rightmost end position. The lifting of pusher link 125 against the urgency of its spring 126 is accomplished by means of an arm 155 (Fig. 1) rotatably mounted on transverse shaft 156. The front end of arm 155 has an integral ear 317 engaging arm 125. The rear end of the lifter arm 155 is provided with an elongated slot 154 which embraces a pin 157 mounted on the forwardly extending arm of a lever 158. The lever is rotatably mounted on gate shaft 65 (see also Figs. 6 and 7). Lever 158 has a right angle extension which carries a roller 159 which lies above one end of a lever 160. The lever 160 is pivoted on a lower end of a lever 162 pivoted on the crossframe member, or rear bearing plate, 41. Lever 162 has an upwardly extending arm which is provided with a formed-over ear 164 which, when the carriage is in the extreme right-hand position (shown in Fig. 7) lies beneath an override pawl 165 which is pivotally mounted on the carriage shift rack 150. This pawl 165 is normally maintained in the position shown in Fig. 7 by means of a spring 167 which urges the pawl against a stud 168 on shift rack 150. When the shiftable carriage 68 reaches the end position shown in this figure, a shift pin 148 engages the lower edge of the pawl 165, and causes the pawl to be rocked clockwise against the urgency of spring 167. The lever 162 will thereby be rocked (counter-clockwise in this figure) against the tension of spring 170, thereby causing the lever 160 to be shifted toward the left (toward the right in Fig. 7). Lever 160 is provided with a cam face 171 which lies beneath a roller 172 mounted on the rear bearing plate 41. Hence, when the lever 160 is so shifted it will be rocked (clockwise in this figure), thereby elevating the rear end of lever 158, and causing the forward end of lifter arm 155 (Fig. 1) to be raised to disengage the pusher link 125 from the push rod 132. This will effectively disable the right shift mechanism and permit compression spring 134 mounted on the forward end of push rod 132 to disengage the previously engaged right shift clutch and thereby terminate the right shift operation.

The foregoing description of the carriage shift mechanism is believed sufficient for a clear understanding of the instant invention, but reference is hereby made to Patent No. 2,380,642 issued to Carl M. Friden et al., on July 31, 1945, for a more detailed disclosure of this part of the machine.

AUTOMATIC ALIGNING MECHANISM (FOR DIVISION)

The machine shown in the accompanying drawings is provided with a mechanism for dividing a dividend registered in the accumulator dials 61 by a divisor set in the keyboard keys 20. The mechanism provided in the present machine for accomplishing this purpose, as was mentioned earlier herein, is substantially identical with that shown in U. S. Patent No. 2,229,889 and, therefore, only those parts of the automatic division mechanism which are directly concerned with the present invention will be described herein. The automatic division mechanism is operative to control the functioning of the machine so as to cause the divisor to be repeatedly subtracted from the dividend until an overdraft occurs in the accumulator, whereupon the overdraft is corrected, the carriage is automatically shifted one ordinal space to the left, and a new series of subtractions initiated. This sequence is continually repeated during the division operation and the number of subtraction cycles effected in each order is registered in the revolutions counter 80 as the quotient. This division operation is controlled by a program control mechanism which is operated each time an overdraft occurs in the accumulator and which functions to program the operation of the digitation control mechanism and the carriage shift mechanism in the sequence of operations above-mentioned during uninterrupted cyclic operation of the machine.

The division operation is initiated by depressing a division key 245 (Fig. 2). This key is mounted for substantially vertical movement on the frame plate 32 by conventional means, and is biased in an upward direction by a conventional spring 248. The lower end of the key stem is provided with a cam face 249 which engages a roller 250 mounted on a slide 251. The slide is mounted for endwise movement by means of a plurality of slots 252 in the slide embracing studs 253 on the frame plate. The slide 251 is thus translated rearwardly by depression of the division key 245. The slide 251, when so translated, is latched in its rearward position by means of a latch arm 208 which is formed with an integral shoulder 207 adapted to engage a short pin 310 on the slide. The latch arm 208 can be suitably mounted in the machine, as upon one of the studs 253 as shown. It is urged into latching engagement with pin 310 by means of a suitable spring 372 tensioned between the latching arm and a stud on the frame plate. The movement of the slide 251 is operative to perform two important functions:

(1) It causes operation of the right shift mechanism, and the motor and clutch, to shift the carriage 62 to the right. The shifting mechanism is held in engagement by the latching of the slide 251 in its rearward position until released by the occurrence of either of two conditions:

(a) The attempted shifting of the carriage to the right beyond its terminal position, or (b) The sensing of a nonzero registration in one of the various orders of the keyboard, and the sensing of a zero condition in the aligned order of the accumulator register 61.

The occurrence of either of these conditions is operative to release the latch 208 as will hereinafter be described, releasing the slide 251 to the force of spring 206 which biases it to its forward position.

(2) The return of the slide 251 to its forward position is operative to initiate a conventional divisional operation. It can be noted at this point that the division operation is controlled by the rocking of a connecting lever 270 (clockwise in Fig. 2), in which position it is latched until the division operation is terminated.

The two operations controlled by the rearward movement of slide 251 and its return to its normal forward position will now be described in the order in which they occur.

1. *Right shift, or aligning, operation*

The depression of the division control key 245, as has been previously mentioned, is operative to cam the slide 251 rearwardly, in which position the slide is latched by the shoulder 207 of latching arm 208 engaging the pin 310 on the slide. Thereafter the key 245 can be released by the operator and the aligning and division operation will continue automatically, in proper sequence. The movement of slide 251 rearwardly also causes the pin 310 to rock an arm 311 (counter-clockwise in Fig. 2) and to hold it in the rocked position until the slide is released at the end of the shifting operation as will hereinafter be described. The arm 311 is rigidly secured to a transverse shaft 312 (also shown in Fig. 1). The shaft 312 carries an arm 313 (Fig. 1) located adjacent the plane of the right shift control arms 123 and 125. The upper end of the arm 313 is adapted to engage, when shaft 312 is rocked by movement of slide 251, a pin 320 on arm 123. Thus depression of the division key 245 is effective to rock arm 123 and the yieldable pusher link 125 to their effective, or shift operating position (counter-clockwise in Fig. 1), thus causing the control rod 132 to be moved rearwardly to its right shift engaging position. Hence, the right shift clutch mechanism is latched in its engaged position until the latch 208 holding slide 251 is released by the occurrence of either of the conditions above mentioned.

The right shift operation is automatically terminated after the carriage 68 reaches its extreme right end position, and the overtravel responsive mechanism, heretofore described, rocks arm 155 to lift the notched end 127 of pusher link 125, against the tension of spring 126, out of engagement with the forward end of the right shift clutch control rod 132. Throughout the period the right shift control rod 132 is held in its clutch-engaging position by engagement of the latch 208 with the pin 310 (Fig. 2), the main cyclic clutch 106 (Fig. 3) is held in engaged position and the normally open contacts of the motor switch, not shown, are held closed by conventional means operating from the rocking of sleeve 121 and arm 123.

(a) *Shift terminating mechanism—operated by attempted shift beyond the terminal position*

It will be recalled that the override pawl 165 (Fig. 7) is rocked during the attempted overstroke of the carriage shift mechanism, which occurs after the carriage reaches its extreme right-hand position, and the shift mechanism attempts to shift the carriage beyond its terminal position. The rocking of the override pawl 165 rocks the lever 162, moving the floating lever 160 (to the right in Fig. 7), whereupon the latter is rocked by the engagement of cam 171 with roller 172. This rocking of lever 160 elevates the roller 159 and rocks the lever 158 and the lifter arm 155 (the latter clockwise in Fig. 1). Such rocking of the lifter arm lifts the notched end 127 of pusher link 125 out of engagement with the shift control rod 132, whereupon rod 132 moves forwardly by the force of its return spring 134 (Fig. 5) so as to disengage the right shift clutch. The rocking of the floating lever 160 is also utilized to release the latch 208 to permit control slide 251 to return to its normal position, simultaneously with the disengagement of the right shift clutch. For this purpose, there is provided a lever 323 (see Figs. 4, 6 and 7) pivotally mounted, as at 324, on the rear bearing plate 41. One end of this lever 323 rests upon roller 159, so that it is rocked (counter-clockwise in Fig. 7) by the upward movement imparted to roller 159 from the override mechanism previously described. Rocking of lever 323 (see especially Fig. 4) depresses one arm 362 of a bellcrank 365 which is pivotally mounted on stud 363 riveted to the frame plate. An upwardly extending arm of bellcrank 365 engages a pin 364 on an upwardly extending arm 361, also pivoted on the pin 363. Rocking of arm 361 depresses a link 366, the upper end of which is pivotally mounted thereon. As link 366 is thus depressed, it rocks lever 367 (clockwise in Fig. 4) about its pivot 368 and moves control link 369 forwardly. Referring now to Fig. 2, it will be seen that link 369 extends longitudinally adjacent the base of the machine the forward end being supported by a pin and slot connection 374. The link 369 carries a stud 370 which is adapted to engage the coacting cam face 371 formed on an arm 375 integral with latch 208. Thus the rocking of override pawl 165, and consequent movement of link 369 and pin 370, is operative to cam latch 208 upwardly against the opposition of spring 372, thus releasing the pin 310 on the division control slide 251 from holding engagement with the notch 207 of latch 208.

(b) *Auxiliary shift terminating mechanism—operated by zero sensing means*

For the most part the mechanism heretofore described is conventional insofar as the present invention is concerned, being substantially the mechanism shown in the copending applications above-mentioned and particularly S. N. 207,958 in which the applicant is a joint inventor. The difficulty with the previous mechanism was that the carriage was shifted to the extreme right-hand position before initiation of a division operation by the rocking of the override pawl 165 as above-described. The present invention involves a means for sensing zeros in all orders of the accumulator, or dividend register, 61 above the highest significant digit of the dividend; a means for sensing a nonzero factor in each of the orders of the keyboard; and means operative, when both sensing means of the same order are operated, to terminate the right shift of the carriage and to initiate a division operation. It is obvious that if only zeros above the highest order of the dividend factor are sensed, that a zero within the divisor must not be effective to terminate the shift and initiate division— only the alignment of the highest order of the divisor with zeros above the highest order of the dividend will be operative to terminate the aligning phase of operation. The mechanism for this operation is shown particularly in Figs. 9 to 12 inclusive.

Figure 10:
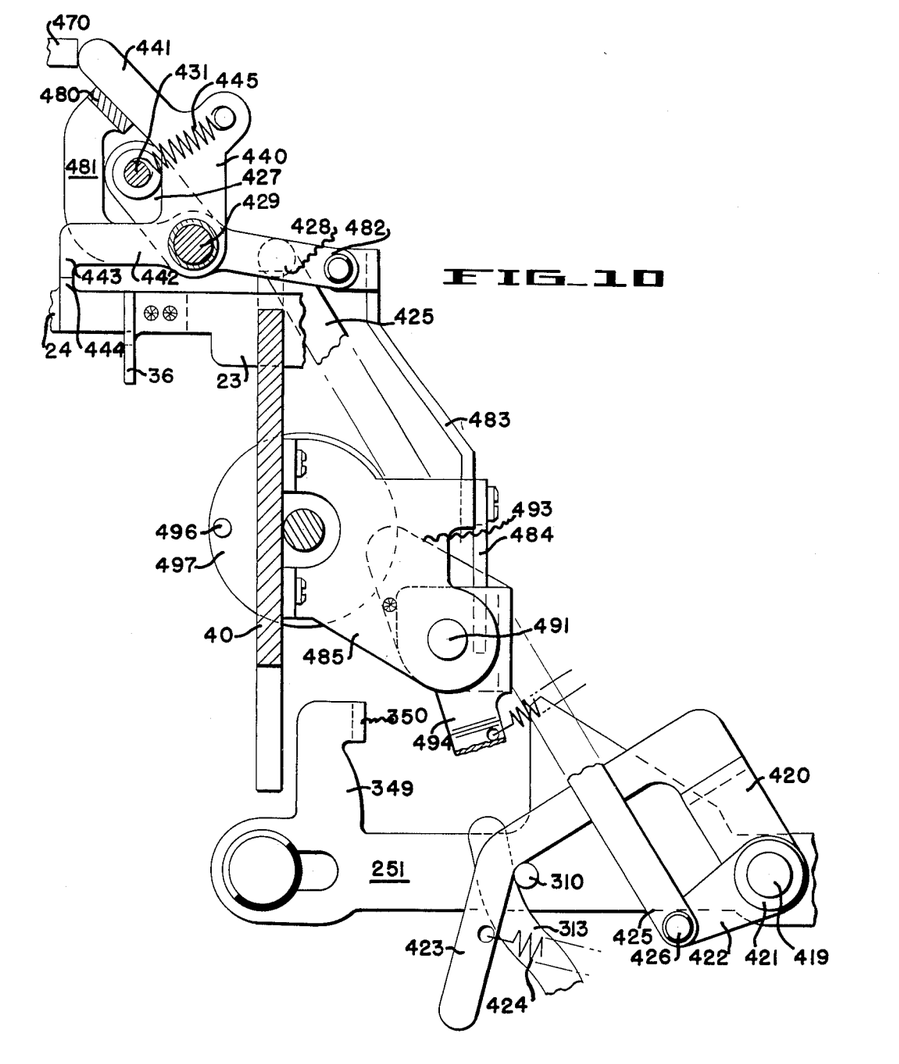
Fig. 10 is an enlarged detail of a portion of the mechanism shown in Fig. 9.
Figure 11:
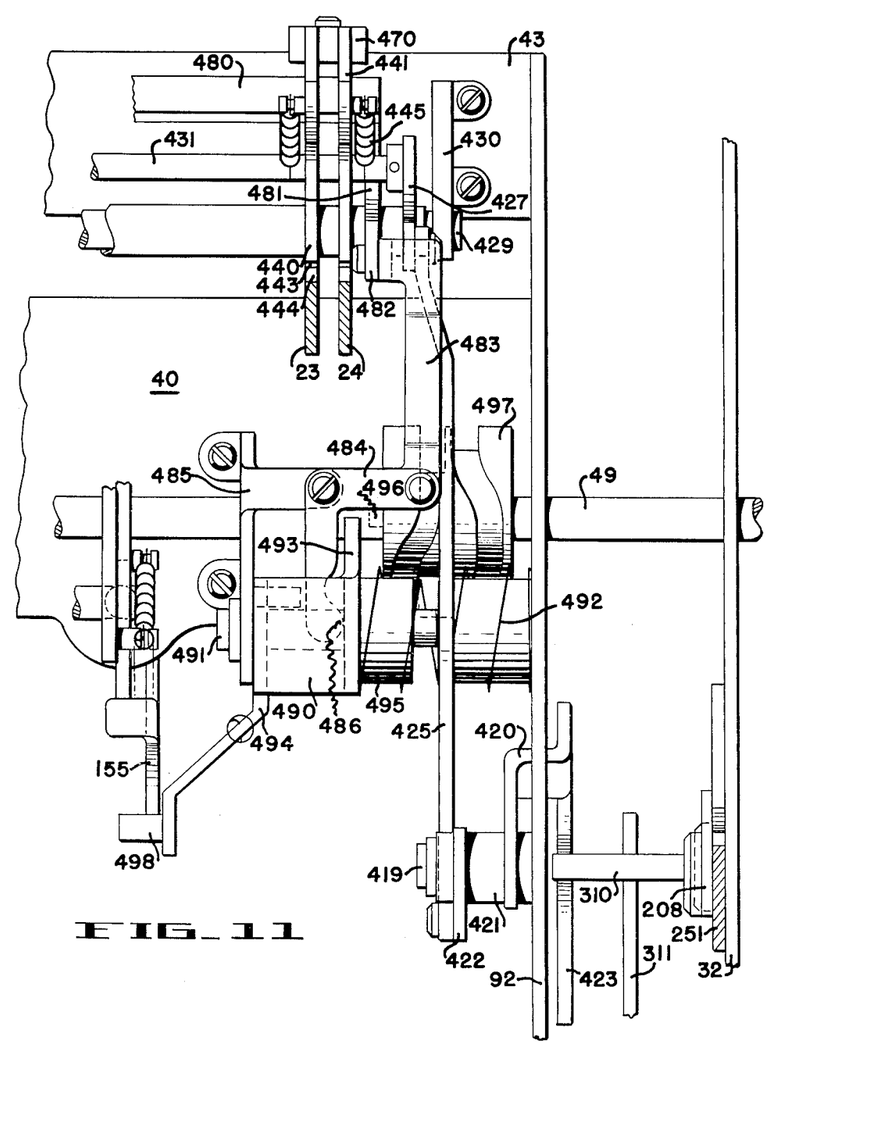
Fig. 11 is a front view of the mechanism shown in Figs. 9 and 10, also in enlarged detail.

The mechanism so mentioned is conditioned for operation by the rearward movement of the division slide 251 previously described. The conditioning mechanism includes an arm 420 (see Figs. 9, 10 and 11) integral with, or fixedly secured to, a sleeve 421, on the opposite end of which is a short arm 422. The assembly including the two arms and sleeve, in effect, form a bellcrank which is pivotally mounted on a stud 419 secured to the right frame plate 92. Preferably the stud 419 is axially aligned with the foremost of the lower studs 253 which support the division slide 251 (as shown in Fig. 11). The arm 420 is bent to extend through an aperture 432 in the frame plate 92, and is formed with a rearwardly extending crooked arm 423 which engages the roller stud 310 mounted on the division slide 251. The arm 423 is resiliently biased into engagement with the roller stud 310 (counter-clockwise in Figs. 9 and 10) by a suitable spring 424 tensioned between the arm and a stud on the frame plate. Thus the translation of the slide 251 rearwardly, by the depression of the division key, rocks the bellcrank formed by the arm 420, sleeve 421 and arm 422 (clockwise in Figs. 9 and 10). An upwardly extending link 425 is pivotally mounted on the free end of the arm 422 by any suitable means, such as pivot stud 426. The upper end of the link is pivotally connected to a rocker arm 427 by any suitable means, such as pivot stud 428. The rocker arm is affixed to a transverse shaft 429 suitably journalled in brackets 430 attached to the crossframe member 43. It can be mentioned that on the left side of the keyboard an arm (not shown) similar to the rearward arm of rocker 427 is rigidly secured to the transverse shaft 429. These two arms, the rearward arm of rocker 427 and the arm just mentioned but not shown, are connected by a transverse bar 431, forming a rigid bail which is rocked by the link 425. Normally the bail formed by the bar 431 is in the forward, inoperative, position shown in Figs. 9 and 10, due to the urgency of spring 424 tensioned between the bent arm 423 and the frame plate as previously mentioned. In this position the sensing means to be described hereafter, is inoperative. However, when the division slide 251 is translated rearwardly, the bellcrank, including the arm 420, is rocked and the link 425 is lifted, the rocker 427 is moved to its operative position (counter-clockwise from the position shown in Figs. 9 and 10), and the two sensing means are thereupon enabled for operation.

Figure 9:
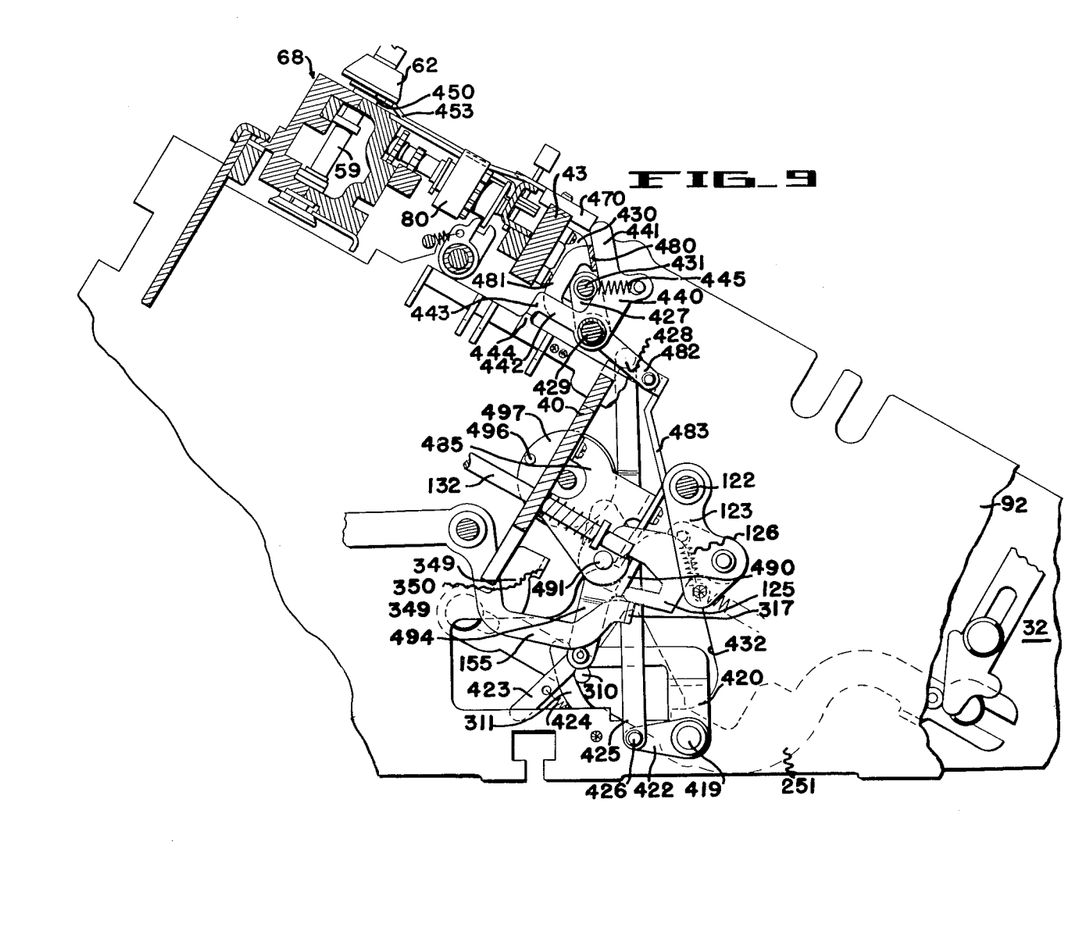
Fig. 9 is a left side elevation of the right-hand frame plate, showing particularly the mechanism for sensing zeros in all orders of the dividend register higher than the highest significant digit thereof, and also the divisor factor set in the keyboard, which mechanism is operative to terminate the right shift operation as soon as the factors are properly aligned.
Figure 12:
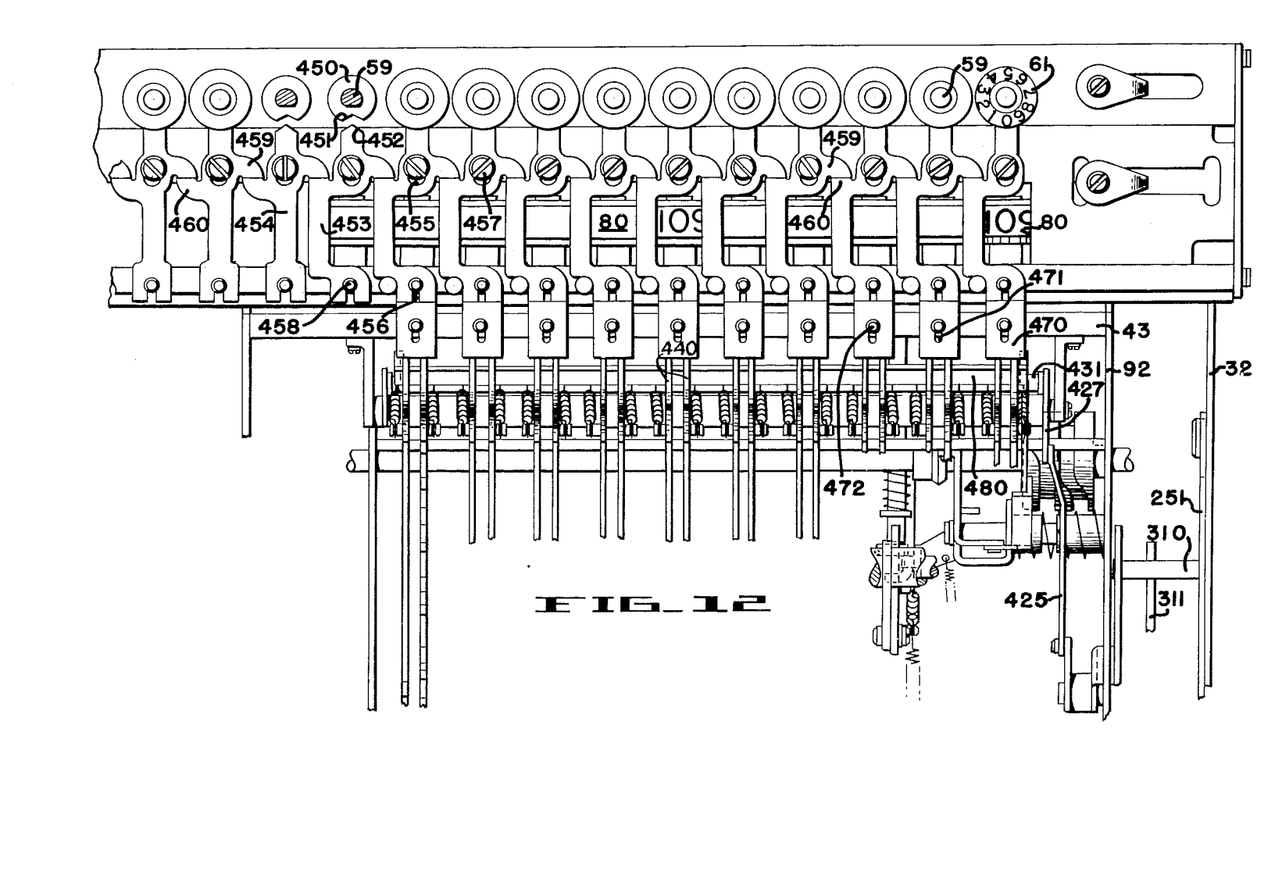
Fig. 12 is a plan view of the carriage, with cover removed, and the associated mechanisms shown in Figs. 9 to 11, inclusive.

A plurality of ordinally arranged sensing members are arranged across the machine, one for each selection slide. In the machine described herein there are two selection slides 23 and 24 for each order of the keyboard, and there is one sensing member for each such slide. In the preferred form of my invention each sensing member comprises a bellcrank 440 individually mounted for rotation on the cross shaft 429. These bellcranks are provided with an upwardly and rearwardly extending arm 441 adapted to engage and sense the position of the ordinally related slide 470 hereafter described. As shown in Fig. 12, the two sensing members 440 of each order are associated with a single sensing slide 470, the latter being ordinally arranged across the machine. The bellcranks 440 are also provided with a rearwardly extending arm 442, on the free end of which is provided a nose 443. The noses 443 on the sensing bellcranks 440 are adapted to engage cooperating noses 444, one of which is mounted on each selection slide 23 or 24 and each of which is adapted to engage the nose 443 of the ordinally related sensing member 440 when the slide is in the "0" position. As shown in Figs. 9 and 10, when a selection slide 23 or 24 is standing in the "0" position, its nose 444 lies under, and is engaged by, the nose 443 of the associated sensing bellcrank 440. However, as soon as a slide 23 or 24 is moved forwardly by the depression of a value key, the nose 444 thereon is moved forwardly beyond the range of the associated nose 443 on the sensing bellcrank, thereby permitting the bellcrank to rock. Each sensing bellcrank 440 is urged into engagement with the bail 431 and with the nose 444 on the selection slides by a suitable spring 445 tensioned between a stud on the bellcrank and the transverse bar 431 (counter-clockwise in Figs. 9 and 10).

It can be mentioned at this point that the rocking of any sensing bellcrank 440, in any order, will be operative to terminate the right shifting operation and to initiate a division operation, as will hereafter be described. For the moment it can be noted that the various sensing bellcranks 440 are blocked from rocking to their operative position in all orders in which the selection slides stand at "0." These bellcranks can be operated only when their associated value selection slides stand at a value other than "0," i. e., only when they sense a nonzero condition. However, operation of the sensing bellcranks 440 is also controlled by the sensing of "0" in orders higher than the highest significant figure of the dividend, so that the bellcrank is held inoperative so long as it is aligned with an order of the dividend in which a value is registered or which lies to the right of a significant value. It is only when an order of the selection mechanism registers a value in an order higher than the highest order of the dividend in the accumulator, or dividend register, that the bellcrank 440 will be permitted to rock to terminate the shifting operation and initiate division.

The means for sensing the zero or nonzero condition of the register will now be described. Each of the accumulator dial shafts 59 is provided with a "0" cam 450 preferably mounted immediately below the dial, as shown in Figs. 1 and 9. Each cam is provided with a "0" notch 451 (see Fig. 12), which notch lies in effective position when the accumulator dial registers "0." Associated with the zero cams 450 are a plurality of ordinally arranged sensing slides, or fingers, 453 and 454, each of which is provided with a nose 452 adapted to enter the zero notch 451 of the associated cam. Preferably two types of slides are used, as shown by the slides 453 and 454 in Fig. 12. It is conventional in machines of this kind to have a number of orders of the counter, or quotient, register corresponding to the number of orders in the keyboard. As it is necessary to sense the ordinally related orders of the accumulator and the keyboard it is necessary that the slides 453 related to the lower orders of the accumulator be formed to go around the counter dials 80, as shown on the right side of Fig. 12. However, in the higher orders the slides 454 can be straight, as shown, on the left side of Fig. 12. In this way both slides 453 and 454, related to the accumulator dials, will be operative upon the sensing bellcranks 440 with which they are associated.

Each of the slides 453 and 454 is provided with slots 455 and 456 which engage screws 457 and studs 458, respectively, to permit rearward or forward sliding of the sensing fingers or slides, 453 and 454. All of the slides, except that of the lowest order, are provided with a shoulder 459 extending to the right which lies immediately behind a cooperating shoulder 460 extending to the left from the slide in the next lower order. Thus, when a value stands in any order of the accumulator, or dividend register, not only as the associated slide 453 or 454 moved to its forward position, but all slides lying to the right thereof are also locked in their forward positions. Thus, only zeros in orders higher than the highest significant figure of the dividend can be sensed by the sensing mechanism.

A plurality of auxiliary sensing slides 470, one for each order of the keyboard, are mounted on the transverse frame bar 43, as shown in Fig. 12. These slides are adapted to act as interponents between the ordinally arranged sensing slides 453 and 454 and the ordinally aligned sensing bellcranks 440 which are mounted adjacent the selection slides. These auxiliary slides 470 can be mounted for longitudinal sliding movement by any suitable means, such as a slot 471 in each slide embracing a pin, or stud, 472 mounted on the crossbar 43. Thus, the auxiliary slides are free to be moved longitudinally, being positively positioned in their forward position (shown in Fig. 12) by the movement of the ordinally related slides 453 and 454 due to the camming action of notch 451 when the ordinally related dial stands at a value other than "0," and to be moved rearwardly when the zero notch 451 and nose 452 of the ordinally related slide are in alignment.

From what has been said before it is obvious that the sensing bellcranks 440 are free to rock (counter-clockwise in Figs. 9 and 10) when both of two conditions exist:

(a) When the ordinally related selection slide 23 or 24 stands at a value other than "0;" and (b) When the ordinally related accumulator, or dividend register, dial 61 stands at a value of "0."

When, and only when, both of these conditions exist, a sensing bellcrank 440 is free to rock (counter-clockwise in Figs. 9 and 10) to its operative position. When either of the conditions does not exist, the bellcrank is blocked against rocking from its inoperative position shown.

The rocking of any zero sensing bellcrank 440 from the inoperative position shown in Figs. 9 and 10 to its operative position (counter-clockwise from the position shown) is operative to terminate the right shifting operation and to initiate a division operation. The mechanism for effecting this control from the operation of any zero sensing bellcrank 440 will now be described. It will be seen by reference to Figs. 9 to 12, inclusive, that a bail 480 extends across the keyboard behind the row of sensing bellcranks 440, and is resiliently biased into engagement with all of them when they are in their normal, inoperative, position. The bail is mounted on arms 481, which are pivotally mounted on the transverse shaft 429. The right-hand arm 481 has an integral forwardly extending arm 482 to which is pivotally secured a formed link 483. The lower end of the link 483, as shown particularly in Fig. 11, is pivotally connected to one arm of a bell crank 484. The bellcrank 484 can be supported by any suitable means but is shown as being pivotally mounted on a bracket member 485 rigidly secured to the transverse frame plate 40. The free end of the bellcrank 484 is provided with a cam nose 486, as shown in Fig. 11.

An operating bail 490 is associated with the bellcrank 484. Preferably this bail is pivotally mounted upon a stub shaft 491 extending between the bracket 485 and the right frame plate 92 (see Fig. 11). The bail 490 is urged to the left, against the arm of bracket 485 by a weak spring 492 seated at one end upon the frame plate 92 and at the other against the arm 493. This spring need be strong enough to bias yoke, or bail, 490 to the left with sufficient force to rock the bellcrank 484 (clockwise in this figure) and resiliently bias the bail 480 against the sensing bellcranks 440. A pair of spaced collars 495 are mounted on the shaft 491 to prevent movement of the bail 490 too far to the right. The right arm 493 of the bail 490 is shaped as shown in Fig. 10 so as to lie, when the bail is moved to the right from the position shown in Fig. 11, in the path of travel of a pin 496 mounted on a conventional wobbler cam 497. Normally the force of spring 492 biases the bail 490 to the left, as shown in Fig. 11, so that the arm 493 lies to the left of the pin 496. However, when the bail 480 is operated by any one of the sensing bellcranks 440 lifting link 483 to rock the bellcrank 484 (counter-clockwise in Fig. 11) the bail 490 is urged to the right against the force of spring 492. When the bail 490 lies in the right-hand position just mentioned the arm 493 lies in the path of travel of the pin 496 and will be rocked at approximately the half-way position in the cycle of machine operation.

The left-hand arm 494 of the operating bail 490 is extended downwardly, as shown in these figures, and is provided at its lower end with a stud 498 which underlies the lifter arm 155 previously described. Thus, when the operating bail 490 is pushed to the right by the operating of the sensing mechanism just described and is subsequently operated by the pin 496 engaging the arm 493, the rocking of the bail (clockwise in Figs. 9 and 10) causes the stud 498 to lift the forward end of lifter arm 155. This rocking of the lifter arm 155 is operative, as previously described, to lift the pusher link 125, which was positioned to translate the right shift push rod 132 rearwardly into clutch engaging position by the initial operation of division slide 251. Thus, the operation of the bail 490 is effective to terminate the right shift operation.

The rocking of the lifter arm 155 is also operative to release the division slide 251, as will be seen by reference to Fig. 1. The lifting of the forward end of the lifter arm 155, as shown in that figure, is operative to rock the lever 158 (counter-clockwise in Fig. 1) to lift the roller 159 on the rear end thereof. The lifting of the roller 159, as shown in Fig. 7, rocks the lever 323 to depress bellcrank 362 (see Fig. 4) and operate link 366, lever 367 and link 369. The operation of lever 369 (as shown in Fig. 2) causes the pin 370 thereon to engage the cam face 371 on the lower arm 375 of latch 208 thereby lifting the latch and releasing the division slide 251. The release of the division slide 251 is operative to initate division operation, as will now be described.

2. Initiating division operation

Upon the release of slide 251 from control of latch 208 it moves from its rearward position to the forward position shown in Fig. 2 due to the bias of the relatively strong spring 206. Forward movement of slide 251 permits arm 311, shaft 312 and arm 313 (Fig. 1) to return to their normal position, by the force of a spring 306, thereby returning the shift control mechanism to its normal position shown.

Figure 8:
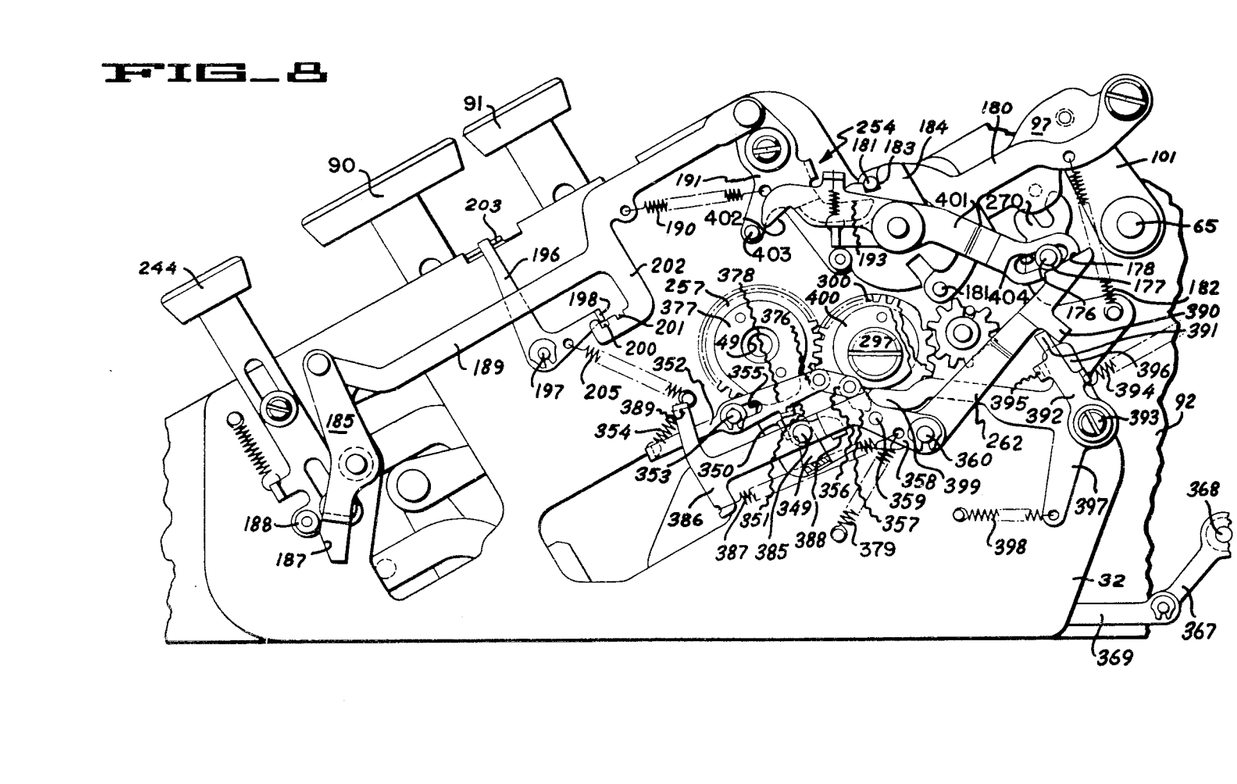
Fig. 8 is a right side elevation of the right-hand control plate, showing those parts of the division and counter control mechanisms which are mounted on the right-hand side of the control plate, and particularly the mechanism for initiating a division operation as soon as the factors are properly aligned.

The return of slide 251 to its normal position shown in Fig. 2 is also operative to rock division control lever 270, which, as previously indicated, controls operation of the automatic division mechanism. For this purpose the division control slide 251 is provided with an upwardly projecting extension 349, the extension having a perpendicular ear, or lug 350, both of which are also shown in Fig. 8. The upper edge of ear 350, upon rearward movement of slide 251, engages a coacting inclined ear 351 on a division initiating pawl 352 (Fig. 8). The two ears 350 and 351 are so constructed that movement of ear 350 cams ear 351 to cause a slight tilting or rocking of the pawl 352 (counter-clockwise in Fig. 8) about its pivot 353. As ear 350 moves rearwardly past the ear 351, spring 354 causes the latter to drop down behind the ear 350 to condition the division initiating pawl for operation. Pawl 352 has an elongated slot 355 therein which forms a sliding pivot connection with the fixed pivot pin 353, the pin being normally held in engagement with the forward end of slot 355 (as shown in Fig. 8) by the resilient action of spring 354. Pawl 352 is also provided with a roller 356, and has a downwardly extending rearward tip 357 which is freely slidable within a longitudinal groove bounded on one side by the right side of division initiating lever 262 and on the other side by a plate 358 having the same general configuration as the forward end of lever 262, which plate is secured to the lever 262 by a suitable spacer rivet 359. The auxiliary plate 358 and division initiating lever 262 form a unitary structure which is free to pivot about the pin 360 mounted on control plate 32, and is urged (counter-clockwise in Fig. 8) by a spring 379 tending to hold a cam face 178 on the upper end of lever 262 in contact with a roller 177 carried by the connecting lever 270. Spring 354 tends to rock pawl 352 (clockwise in Fig. 8) about its pivot 353 so as to resiliently hold the roller 356 on pawl 352 in freely slidable cam-acting engagement with the coacting upper surface of the forward arm of division initiating lever 262.

As slide 251 is moved forward (to the left in Fig. 8) by strong spring 206 from its rearward to its forward position, the forward face of ear 350 thereon engages the rear edge of ear 351, thereby moving pawl 352 forwardly along with slide 251, against the tension of spring 354. The forward movement of pawl 352 moves the rear portion of slot 355 into engagement with the fixed pivot pin 353, while the roller 356 on the pawl 352 moves along the coacting upper plane surface on lever 262. This forward movement which is thus imparted to pawl 352 by engagement of ear 351 with the lug 350 brings a cam follower roller 376 on pawl 352 into the operative path of a plate cam 377 which is rigidly mounted on the main drive shaft 49 of the machine. After pawl 352 is thus moved forwardly to its active position, the high point 378 of cam 377 engages the follower 376 and rocks the rear end of pawl 352 downwardly (clockwise in Fig. 8) about its pivot 353, causing the pawl roller 356 to rock lever 262 (counter-clockwise) about its pivot 360. Such rocking of initiating lever 262 causes the camming surface 178 thereon to lift roller 177 and connecting link 270 into operative position, thus initiating an automatic division operation of the machine.

The construction and operation of the division control mechanism of the machine with which my invention is associated, is fully shown and described in the said Patent 2,229,889 and the said copending applications above-mentioned. It can be noted however, that the connecting link 270 is latched in its operative position (clockwise from the position shown in Fig. 2 or counter-clockwise from the position shown in Fig. 8) throughout the division operation. The rocking of the connecting link 270 closes the motor switch, causes the engagement of the main clutch and is operative to control the sequence of operations for the division operation. As the mechanism controlled and operated by the connecting link 270 is conventional and has been often described, it will not be repeated here.

It is necessary to restore the pawl 352 to its normally ineffective position after initiation of the automatic division operation. For this purpose a yieldable holding arm 386 is pivotally mounted on the forward end of lever 262, as by means of stud 385. The holding arm 386 is urged by a relatively strong spring 387 to the position shown in Fig. 8, in which position an ear 388 on the arm normally abuts the lower forward edge of lever 262, thereby limiting counter-clockwise rotation of the yieldable arm 386. An upper extension of arm 386 is provided with an ear 389 which overlies the forward end of pawl 352. Hence, when arm 262 is rocked counter-clockwise to its division initiating position by the power operation of the pawl 352, the ear 389 engages the pawl 352. The force of spring 387 would normally rock pawl 352 (counter-clockwise in Fig. 8), but so long as such rocking is blocked by the roller 376 on the pawl engaging the high face 378 of cam 377, the holding arm 386 will rock against the force of strong spring 387. However, as soon as the high face of cam rotates beyond roller 376, and pawl 352 is thus free to rock, the force of spring 387 overcomes that of spring 354, whereby the holding arm 386 is returned to its normal position and then the ear 389 rocks pawl 352 (counter-clockwise in Fig. 8) and the ear 351 thereon is lifted above, and thus is free to be urged rearwardly past, the connecting lug 350 on slide 251 by the resilient action of spring 354.

While pawl 352 is thus being restored by spring 354 to the initial position shown in Fig. 8, lever 262 is positively held in its division-initiating position by latching engagement of a downwardly extending projection 390 thereon with an upwardly extending tip 391 on a latching arm 392, which is urged in a latching direction about its pivot 393 by a spring 394. Rocking of arm 392 (clockwise in Fig. 8) is limited by engagement of an ear 395 on arm 392 with the upwardly extending arm 396 of a bellcrank 397. This bellcrank is urged (in a clockwise direction in Fig. 8) about its pivot 393 by a spring 398 which urges a forwardly extending arm 399 on bellcrank 397 into contact with a cam 400 secured to the outer face of idler gear 300 driven by gear 257 on drive shaft 49. It will thus be seen that the initiating lever 262 is held in active position while pawl 352 is restored by the spring 354 to the inoperative position shown. Shortly after the high point 378 of cam 377 moves past roller 376 and enables pawl 352 to be returned to the spring 354 to its normally ineffective position, the high point of cam 400 coacts with arm 399 to rock bellcrank 397 and lever 392 (counter-clockwise in Fig. 8), thus moving lever 392 to its normally ineffective position, in which tip 391 is moved in front of extension 390 on lever 262. It may be mentioned that after lever 392 is thus released from engagement with lug 390, the connecting lever 270 is retained in operative position by a conventional spring-urged latch, not shown, and that the connecting lever 270 is not restored to the inoperative position shown in Figs. 2 and 8 until the automatic division operation has been completed.

*Counter control and latch*

The machine with which my invention is preferably associated is conventionally provided with a mechanism effective during operation of the machine for selectively determining like or unlike registration of the revolutions counter mechanism with respect to the accumulator, thereby permitting the operator to selectively secure a true quotient or the tens complement thereof. For this purpose, there is indicated generally at 254 (Fig. 8) a counter-control mechanism of the type shown and described in Patent No. 2,294,111, granted to Carl M. F. Friden on August 25, 1942. Briefly, such a mechanism includes a control link 180 pivotally connected to the digitation control slide 97 and hence is moved simultaneously with rocking of the gate control shaft 65. This link is provided with a forked forward end carrying pins 181 adapted to engage coacting slots 183 on a counter setting member 184. A spring 182 tensioned between arm 180 and the frame normally determines like registration in the accumulator dials 61 and revolutions counter dials 80, as described in the patent.

The position of the counter control mechanism shown in Fig. 8 determines like registration of the counter and accumulator, thereby giving a complementary quotient. Thus the operation of the counter control mechanism normally must be reversed to determine unlike registration in the accumulator and revolutions counter in order that true figure quotients will be obtained. For this purpose there is provided a counter-reversing key 244 which, when depressed, rocks bellcrank 185 counter-clockwise about its pivot by engagement of a stud 188 on the key stem, with a cam face 187 on the bellcrank. Rocking of bellcrank 185 moves a control link 189 forwardly against the tension of a return spring 190. The rear end of the link 189 is pivotally connected to a bellcrank 191 by any suitable means, such as the pin shown. Whenever bellcrank 191 is rocked (counter-clockwise in Fig. 8) by the control link 189, a rearwardly extending finger 193 on the bellcrank engages and lifts the upper pin 181 out of the coacting notch 183, and the lower pin 181 (on the lower fork of arm 180) into engagement with the lower slot in the member 184. In this position the counter-control mechanism is set for unlike registration in the revolutions counter with respect to the accumulator, as described in the above-mentioned Patent No. 2,294,111.

It is conventional in machines of the type disclosed in the Patent 2,229,889 above-mentioned, to provide means for locking the counter control mechanism 254 in either of its adjusted positions, during a division operation. The conventional means is shown in Fig. 8, and includes a locking arm 401. The forward end of the arm 401 is provided with a nose 402 adapted to drop behind or in front of an associated stud 403 on the bellcrank 191. The rear end of the arm 401 is provided with a slot 404 which embraces the roller 177, as shown. Thus, the rocking of the division control arm 270 is operative to rock the latching arm 401, whereupon the nose 402 drops either behind or in front of the stud 403, holding bellcrank 191 in either adjusted position throughout the division operation. In addition to the conventional mechanism shown, it is necessary, in connection with my invention, to provide means for locking the counter control mechanism 254 in either adjusted position during the aligning phase, i. e., throughout the right shift operation of the carriage, and until the latch 401 is operated by control link 270. The means for so locking the counter control mechanism 254 is also shown in Fig. 8 and includes a bellcrank 196 pivoted on the auxiliary frame plate 32 by any suitable means, such as stud 197. This bellcrank 196 is urged in an operative direction (clockwise in Fig. 8) by a spring 205 tensioned between the lower arm of the bellcrank and a suitable stud on the frame plate as shown. The lower arm of the bellcrank 196 is provided with an ear 198 adapted to engage one of the notches 200, 201 on a downwardly and forwardly extending extension 202 on the counter control link 189. Whenever the machine is in its full-cycle position, an ear 203 which extends laterally from the clutch and switch link 107 (Fig. 3) rocks bellcrank 196 against the tension of its spring 205 (counter-clockwise in Fig. 8), to release ear 198 from locking engagement with the notches 200, 201. Thus the setting of the counter control mechanism 254 can then be easily changed by the control means described. However, operation of the motor and clutch moves link 107 and ear 203 rearwardly, thereby permitting spring 205 to rock bellcrank 196 (clockwise in Fig. 8). Such rocking of bellcrank 196 enables ear 198 to engage one of the notches 200, 201 on the counter control link 189, thereby locking the counter control mechanism 254 in its adjusted position for as long as the machine is operating.

Operation

The operation of the present invention can be readily understood by reference to the division of, for example, 4000÷30. For purposes of illustration we will assume that these factors are registered in the four right-hand dials of the accumulator register and the two right-hand orders of the keyboard. After the placing of the factors in the machine, they will stand in this ordinal relationship:

4000—dividend (accumulator register 61)
30—divisor (keyboard 20)

When the division key is depressed, the slide 251 is moved rearwardly, as heretofore explained. Such translation of the slide 251, as shown particularly in Fig. 9, causes the rocking of arm 420 and its integral sleeve 421 and outer arm 422 (clockwise in this figure). The rocking of this unit lifts link 425, which rocks the bellcrank 427 (counter-clockwise in this figure), and its integral bail 431. This action releases all of the sensing bellcranks 440 for operation, and tensions the springs 445 to urge each of the sensing bellcranks into sensing engagement (counter-clockwise) with the selection slides 23 and 24 and the accumulator sensing slides 470. At this stage each of the four sensing slides 453 of the four lower orders of the accumulator register are moved forward by the dial in the "thousands" order (4th order from the right) being rotated away from its "0" position. In that order the nose 452 of the sensing slide is engaged with the periphery of the cam 450 rather than with the notch 451 thereof. The movement of this slide 453 forward causes all of the slides lying to its right to also be in their forward position, even though the noses 452 of the three right-hand slides are aligned with the zero notch 451 of their related zero sensing cams 450.

In the keyboard the selection slides 23 and 24 of the units, hundreds and thousands order stand at "0," whereby the noses 444 on the selection slides of that order block rocking of the sensing bellcrank 440. In the tens order the selection slide 23 has been moved forward from its "0" position so that the nose 444 on that slide has moved forward of the associated nose 443 on the sensing bellcrank 440, thereby permitting the bellcrank to rock insofar as the selection slide itself is concerned. There being one such bellcrank, for each slide, the fact that the other slide 24 of that order still remains in its "0" position would not be material. However, the bellcrank 440 associated with slide 23 of the tens order cannot rock as its upper nose 441 engages the zero sensing slide 470 for the ordinally aligned accumulator register as previously explained. In this condition the right shift of the carriage is not disabled and the carriage shifts toward the right.

It can be noted also that while the zero sensing slides of the register from the 5th order and higher stand at "0," thereby permitting the sensing slides 453, 454 and 470 to move rearwardly, as the zero notches 451 in all such orders are aligned with the noses 452 of the slides 453, 454, this condition does not effect machine operation as in those orders all of the sensing mechanisms for the related orders of the keyboard are blocked against operation.

After two shifting cycles of the carriage to the right the factors stand as follows:

4000
30

In this situation the sensing mechanism of the keyboard would permit rocking of the sensing bellcrank 440, but such rocking is still prevented as the slide 470 in the aligned accumulator order (the 4th order from the right) is still blocked against rearward movement as above described. In this condition a further shift is initiated.

After the third shift, the factors stand as follows:

04000
30

In this condition the selection slide 23 of the tens keyboard order still is in a position which would permit the related sensing bellcrank 440 to rock to its shift-terminating position. When this ordinal position is reached, the 5th order of the accumulator register stands at "0" so that in that order the zero notch 451 of the zero sensing cam 450 is aligned with the nose 452 of the sensing slide 453. Therefore, the force of spring 445 can rock the bellcrank 440 (counter-clockwise in Fig. 10) as slide 470 and its related sensing finger or slide 453 are free to move rearwardly. The rocking of this single sensing bellcrank 440 rocks the initiating bail 480 which, through the mechanism heretofore described, lifts the initiating link 483 to rock bellcrank 484 (counter-clockwise in Fig. 11). This rocking of bellcrank 484 moves the operating interponent or bail 490 to the right so that its right-hand arm 493 lies in the path of travel of the pin 496. At approximately the halfway point in that cycle of operation, the pin 496 engages the arm 493 rocking the bail 490 to lift the lifter arm 155. The rocking of this lifter arm, through the linkage heretofore described, moves link 369 (Fig. 2) forwardly whereby the pin 370 carried thereby engages the cam face 371 of the latch arm 208, lifting the latch arm to release slide 251. The release of slide 251 initiates a division operation as heretofore explained.

It is believed obvious from the preceding description of the mechanism of my invention, and its method of operation, that the mechanism here provided is effective, upon depression of the division key, to lock the machine in a right shift operation. This right shifting of the carriage is terminated when either of two conditions exist:

(a) When the carriage has reached its extreme right-hand position, as is conventional, or (b) When the highest order of the divisor factors set in the keyboard lies one order to the left of the highest order of the dividend which has been set in the accumulator, or dividend register.

Thereafter the machine operates in division in a conventional manner.

I claim:

1. In a calculating machine having an ordinally arranged register, an ordinally arranged selection mechanism, and an operation initiating member operable to initiate a first machine operation and then a second machine operation, the combination which comprises means for sensing a zero setting in each order of the register higher than the highest significant digit therein, means for sensing a nonzero setting in each order of the selection mechanism, control means conditioned by said initiating member and operated by the first mentioned sensing means sensing a zero condition in a said higher order of the register and by the second mentioned sensing means sensing a nonzero condition in the aligned order of the selection mechanism, and means operated by said control means to terminate said first machine operation and initiate said second machine operation.

2. In a calculating machine having an ordinally arranged register, an ordinally arranged selection mechanism and means for shifting the register in either direction, the combination which comprises means for initiating operation of said shifting means for plural cycle shifting of said register in a predetermined direction, means for sensing a zero setting in each order of the register higher than the highest significant digit therein, means for sensing a nonzero setting in each order of the selection mechanism, and control means operated by the joint operation of an ordinally arranged pair of said sensing means for terminating the operation of said shifting means.

3. In a calculating machine having a carriage, a dividend register mounted in said carriage, means for shifting said carriage in either direction, a selection mechanism, means for transmitting a value determined by said selection mechanism into said register additively or substractively, a division control mechanism operative to control operation of said value transmitting means and said shifting means to divide a value registered in said dividend register by a value set in said selection mechanism, a control key, means for sensing a zero value in each order of the dividend register higher than the highest significant digit therein, means for sensing a nonzero setting of each order of the selection mechanism, means operated by said control key and effective to operate the shifting means to shift the carriage to the right, control means jointly operated by an ordinally arranged pair of the said sensing means for terminating operation of the shifting means and initiating operation of the division mechanism.

4. In a calculating machine having a register for receiving a dividend factor, a selection means for receiving a divisor factor, a positionable value entering mechanism for transmitting a value set in the selection means into the register, and shifting means for laterally moving the said register in either direction relative to the said value entering mechanism, the combination with an automatic division mechanism of the successive subtraction type which comprises a manually positionable division control member operable to cause the said shifting means to move the said carriage toward its rightmost end position, means for sensing a nonsignificant zero setting in each order of the register, means for sensing a nonzero setting in each order of the selection means, control means operated by the first metioned sensing means sensing a nonsignificant zero condition in one of the orders of the register and by the second mentioned sensing means sensing a nonzero condition in the aligned order of the selection mechanism, a second control means operable after the carriage is moved to its rightmost end position, and means operated by either of said control means and operable to terminate the operation of the said shifting means and to initiate operate of the division mechanism.

5. In a calculating machine having an ordinally arranged register for receiving a dividend factor, an ordinally arranged selection means for receiving a divisor factor, a value entering mechanism for transmitting a value set in the selection means into the register additively or subtractively, and shifting means for laterally moving the said register in either direction relative to the said value entering mechanism, the combination with an automatic division mechanism operative to control operation of the value entering mechanism and the shifting means to divide a dividend factor set in said register by a divisor factor set in the selection means which comprises a positionable division control member operable to initiate and control operation of said division mechanism, a manually operated member operable to initiate operation of the said shifting means to move the said carriage toward its rightmost end position and to condition said division control member for operation, means for sensing a zero setting in each order of the register higher than the highest significant digit therein, means for sensing a nonzero setting in each order of the selection means, control means operated by the first mentioned sensing means sensing a zero condition in a said higher order of the register and by the second mentioned sensing means sensing a nonzero condition in the aligned order of the selection means, and means operated by said control means and operable to terminate the operation of the carriage shifting means, and to position said division control member in its operative position to initiate operation of the division mechanism.

6. In a calculating machine having a carriage, a dividend register mounted in said carriage, means for shifting said carriage in either direction, a selection mechanism, means for transmitting a value determined by said selection mechanism into said register additively or subtractively, a division control mechanism operative to control operation of said value transmitting means and said shifting means to divide a value registered in said dividend register by a value set in said selection mechanism, positionable means operable to initiate operation of said division control mechanism, a key, means for sensing a zero or nonzero value in each order of the dividend register above the highest significant digit, means for sensing a zero or nonzero setting of each order of the selection mechanism, shift control means operated by said key and operative to operate the shifting means to shift the carriage to the right, means for latching said control means in said right shift position, control means operated by the sensing means associated with said register sensing a zero condition in a said higher order of the register and by the sensing means associated with the selection mechanism sensing a nonzero condition in the aligned order of the selection mechanism, and means operated by the said control means to unlatch the shift control means and to position said positionable means in its operative position.

7. A calculating machine comprising an automatic division mechanism, an amount entering means for receiving a divisor factor, a register for receiving a dividend factor, mechanism for laterally shifting the said register in either direction relative to the said amount entering means, a positionable division control member, resilient means biasing said member to an inoperative position, means for latching said member in an operative position, mechanism controlled by said positionable member in its operative position for causing the said shifting mechanism to continuously shift the said register toward its rightmost end position, means for sensing a zero condition in each order of the said register when no significant digit appears to the left thereof, means for sensing a non-zero setting in each order of the amount entering means, control means jointly operated by both of the said sensing means in the same order of the register and amount entering means for unlatching the said positionable member and thereby terminating the operation of the shifting mechanism, and means operated by the member in returning to its inoperative position for initiating operation of the said automatic division mechanism.

8. A calculating machine comprising an ordinally arranged amount entering means for receiving a divisor factor, an ordinally arranged register for receiving a dividend factor, mechanism for laterally shifting the said register in either direction relative to the said amount entering means, a division mechanism operative to control operation of the amount entering means and the shifting mechanism to divide a dividend factor set in the register by a divisor set in the amount entering means, a positionable control member, resilient means biasing said member to an inoperative position, means for latching said member in an operative position, mechanism controlled by said positionable member in its operative position for operating the said shifting mechanism to move the said register continuously toward its rightmost end position, an ordinally arranged means for sensing a non-zero setting in each order of the amount entering means and for sensing a "0" in each order of the said register aligned with said amount entering means when no significant digit appears to the left thereof, control means operated by the sensing means, a second control means operated by the attempted overtravel movement of the said register beyond its rightmost end position, means operated by either of said control means for unlatching the said positionable member and thereby terminating operation of the shifting mechanism, and means operated by the member in returning to its inoperative position for initiating operation of the said division mechanism.

9. In a calculating machine having an automatic division mechanism, the combination which comprises an ordinally arranged amount entering means for receiving a divisor factor, an ordinally arranged register for receiving a dividend factor, mechanism for laterally shifting the said register in either direction relative to the said amount entering means, a positionable division control member, resilient means biasing said member to an inoperative position, means for latching said member in an operative position, mechanism controlled by said positionable member in its operative position for causing the said shifting mechanism to move the said register toward its rightmost end position, means for sensing a zero or nonzero condition in each order of the said register above the highest significant digit, means for sensing a zero or nonzero setting in each order of the amount entering means, control means operated by the first mentioned sensing means sensing a zero condition in an order of the register above the highest significant digit and by the second sensing means sensing a nonzero condition in the aligned order of the amount entering means, a second control means operated by the shifting mechanism in attempted overtravel movement of the said register beyond its rightmost end position, means operated by either of said control means for unlatching the said positionable member and thereby terminating the operation of the said shifting mechanism, and means operated by the said member in returning to its inoperative position for initiating operation of the said automatic division mechanism.

References Cited in the file of this patent

UNITED STATES PATENTS

| | | |
|---|---|---|
| 2,365,507 | Allen | Dec. 19, 1944 |
| 2,653,762 | Ellerbeck | Sept. 29, 1953 |
| 2,653,763 | Hopkins | Sept. 29, 1953 |
| 2,653,764 | Hopkins | Sept. 29, 1953 |
| 2,653,765 | Machado | Sept. 29, 1953 |